No. 772,452. PATENTED OCT. 18, 1904.
B. R. BENJAMIN & J. W. PRIDMORE.
CORN HARVESTER.
APPLICATION FILED MAR. 28, 1903.
NO MODEL. 8 SHEETS—SHEET 1.
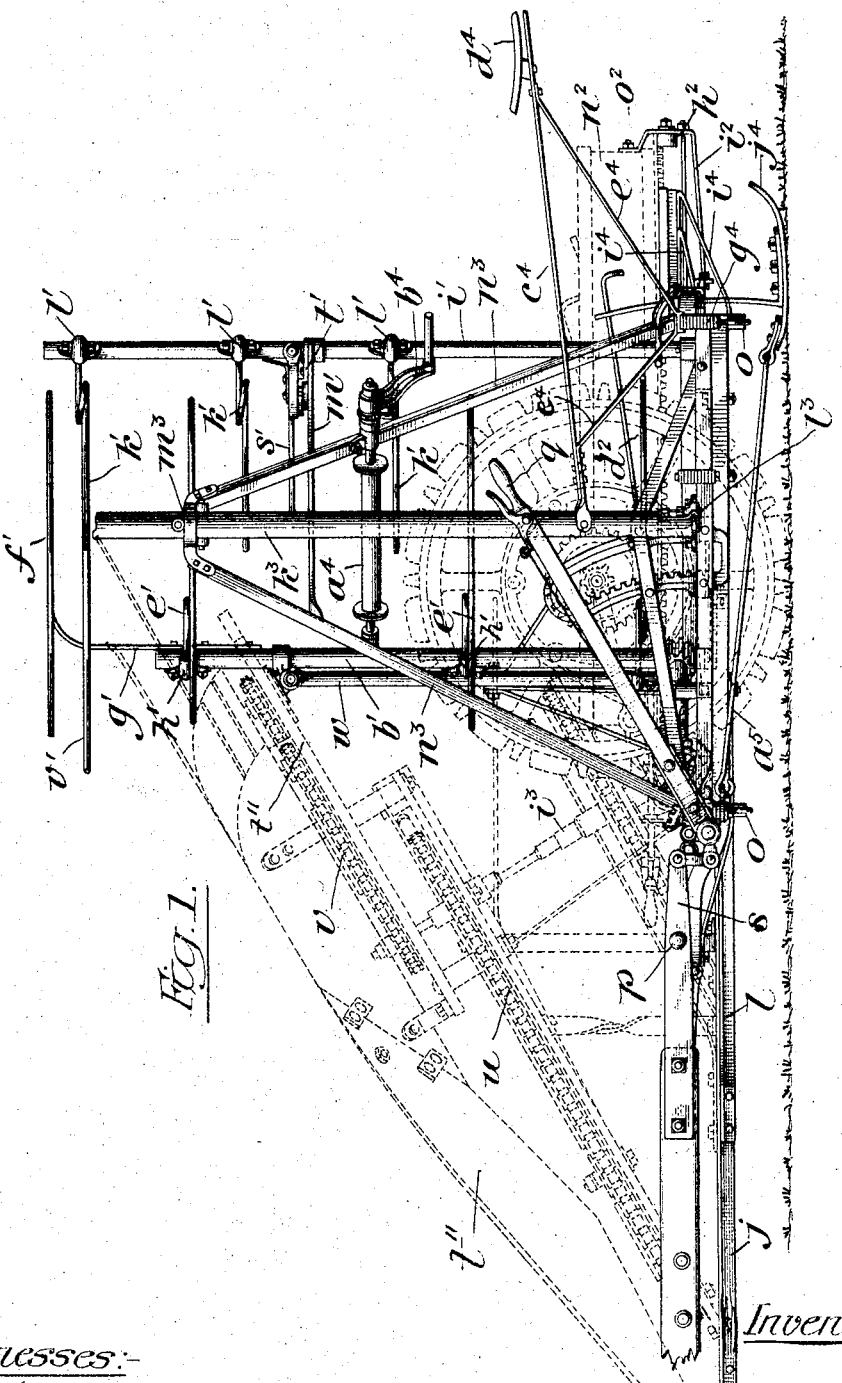
Witnesses:—
Inventors.

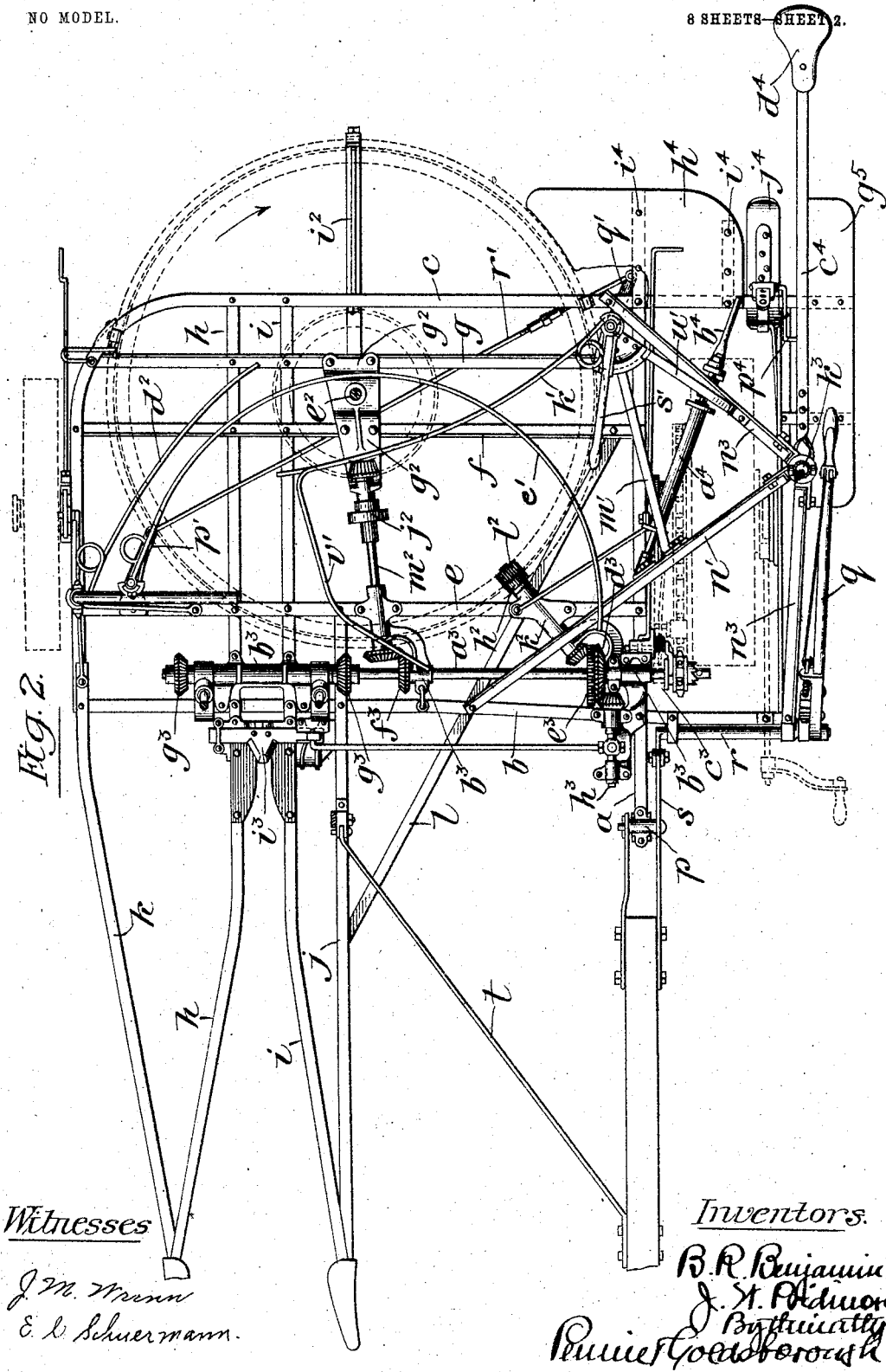

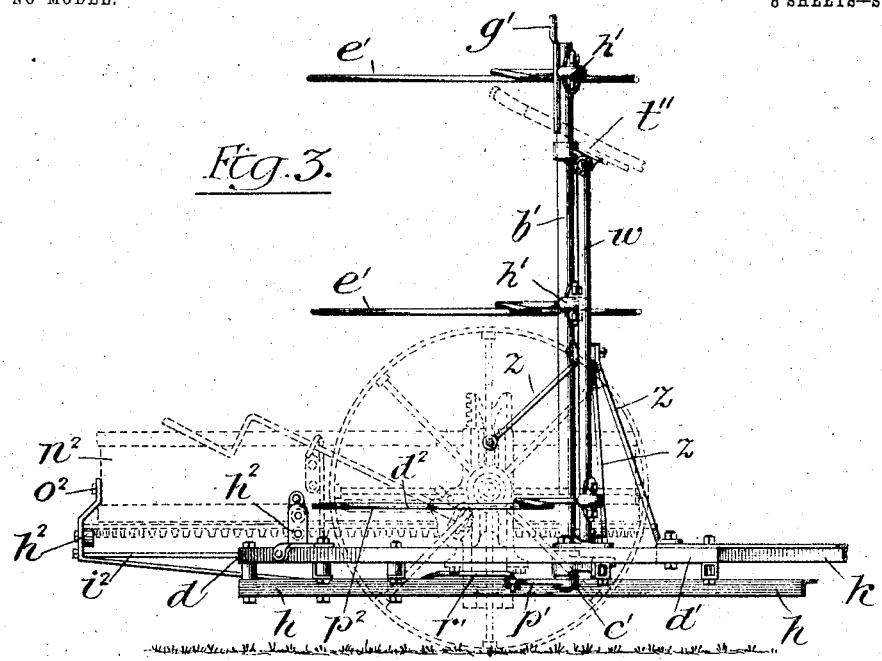
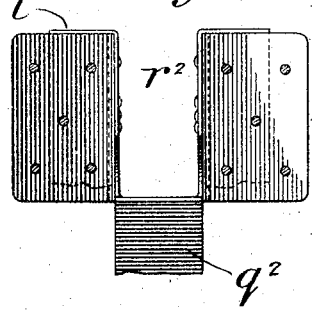
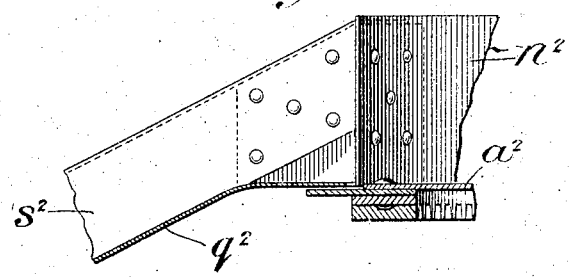

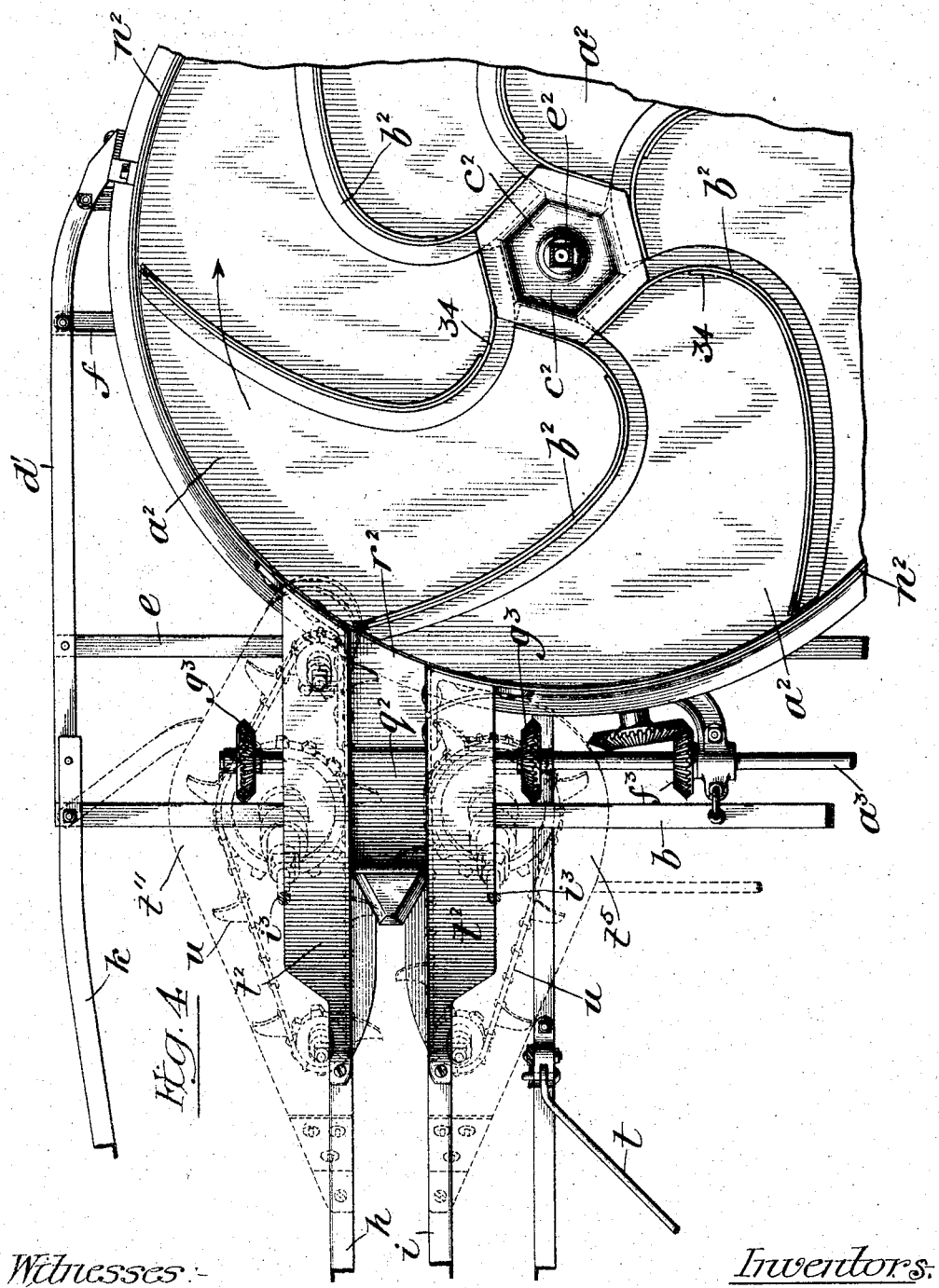

No. 772,452. PATENTED OCT. 18, 1904.
B. R. BENJAMIN & J. W. PRIDMORE.
CORN HARVESTER.
APPLICATION FILED MAR. 28, 1903.
NO MODEL. 8 SHEETS—SHEET 5.
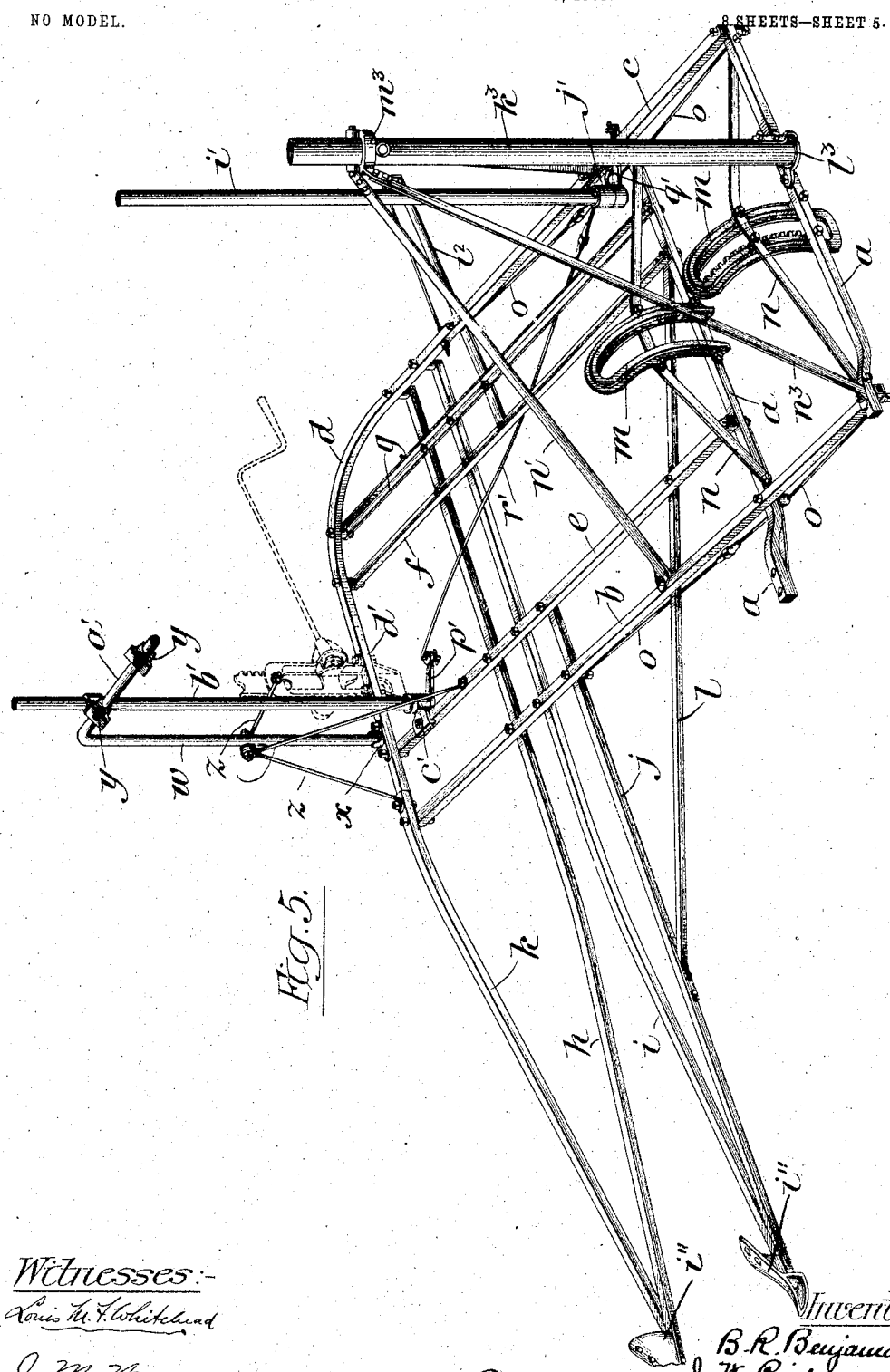

No. 772,452. PATENTED OCT. 18, 1904.
B. R. BENJAMIN & J. W. PRIDMORE.
CORN HARVESTER.
APPLICATION FILED MAR. 28, 1903.
NO MODEL. 8 SHEETS—SHEET 6.
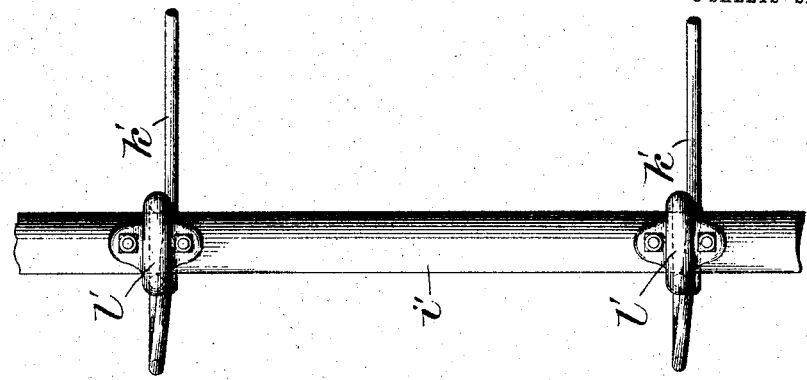
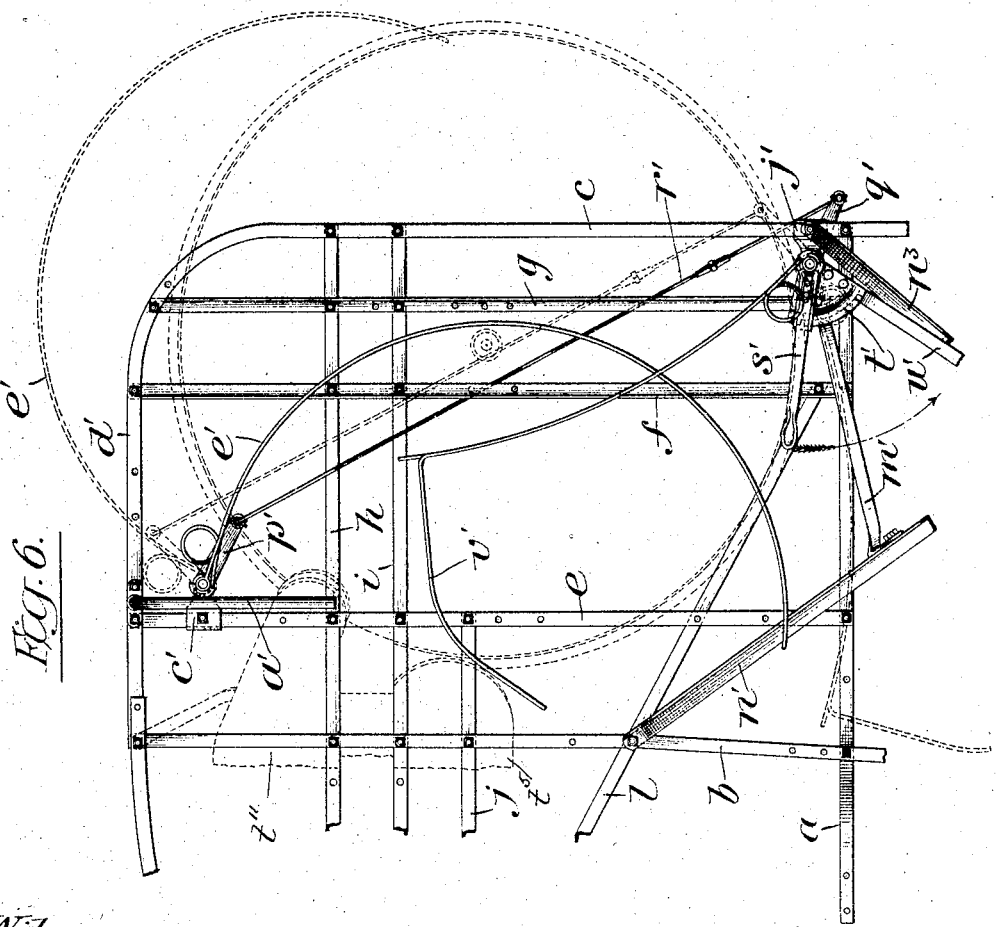
Witnesses:
Inventors.

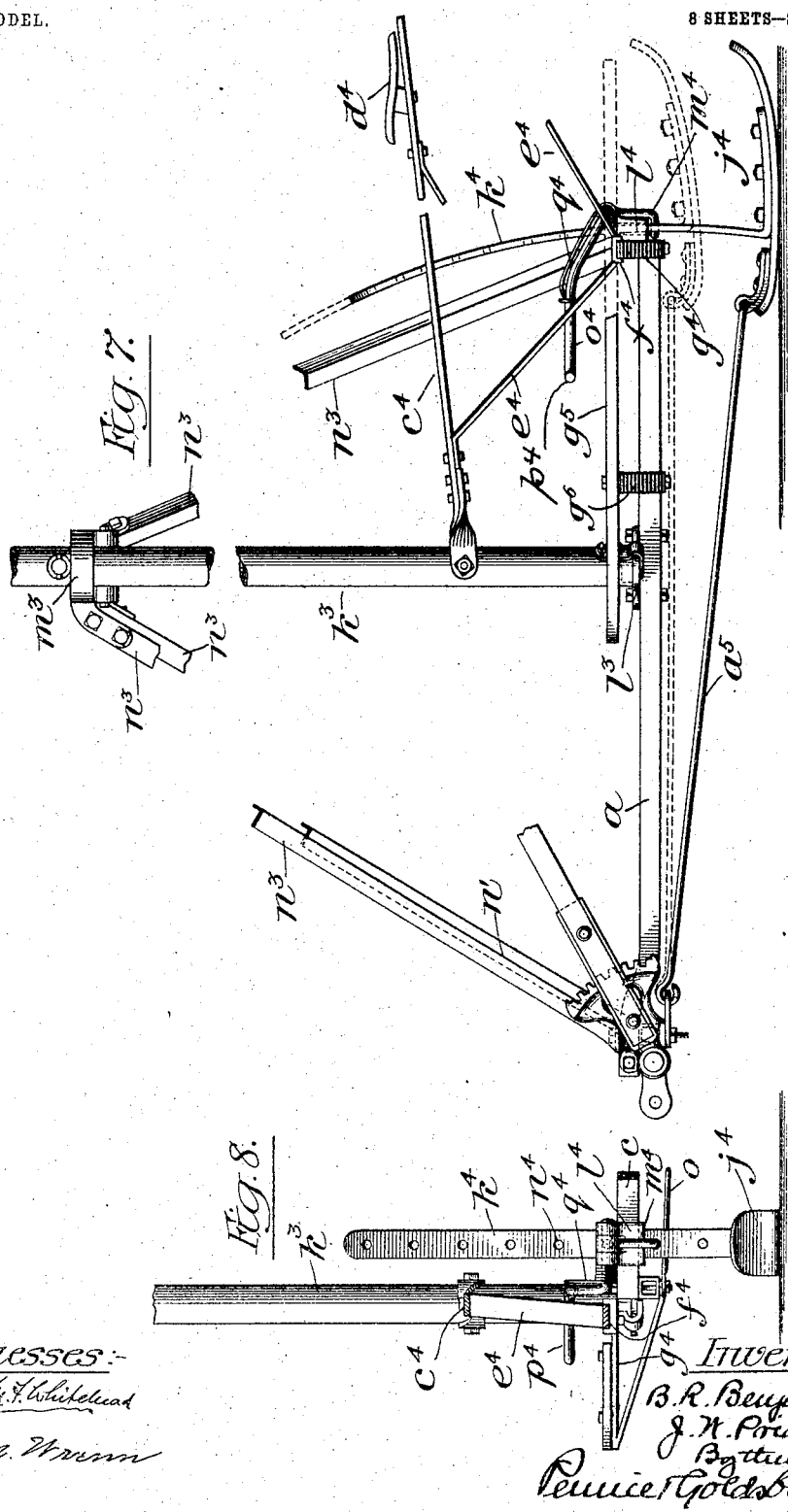

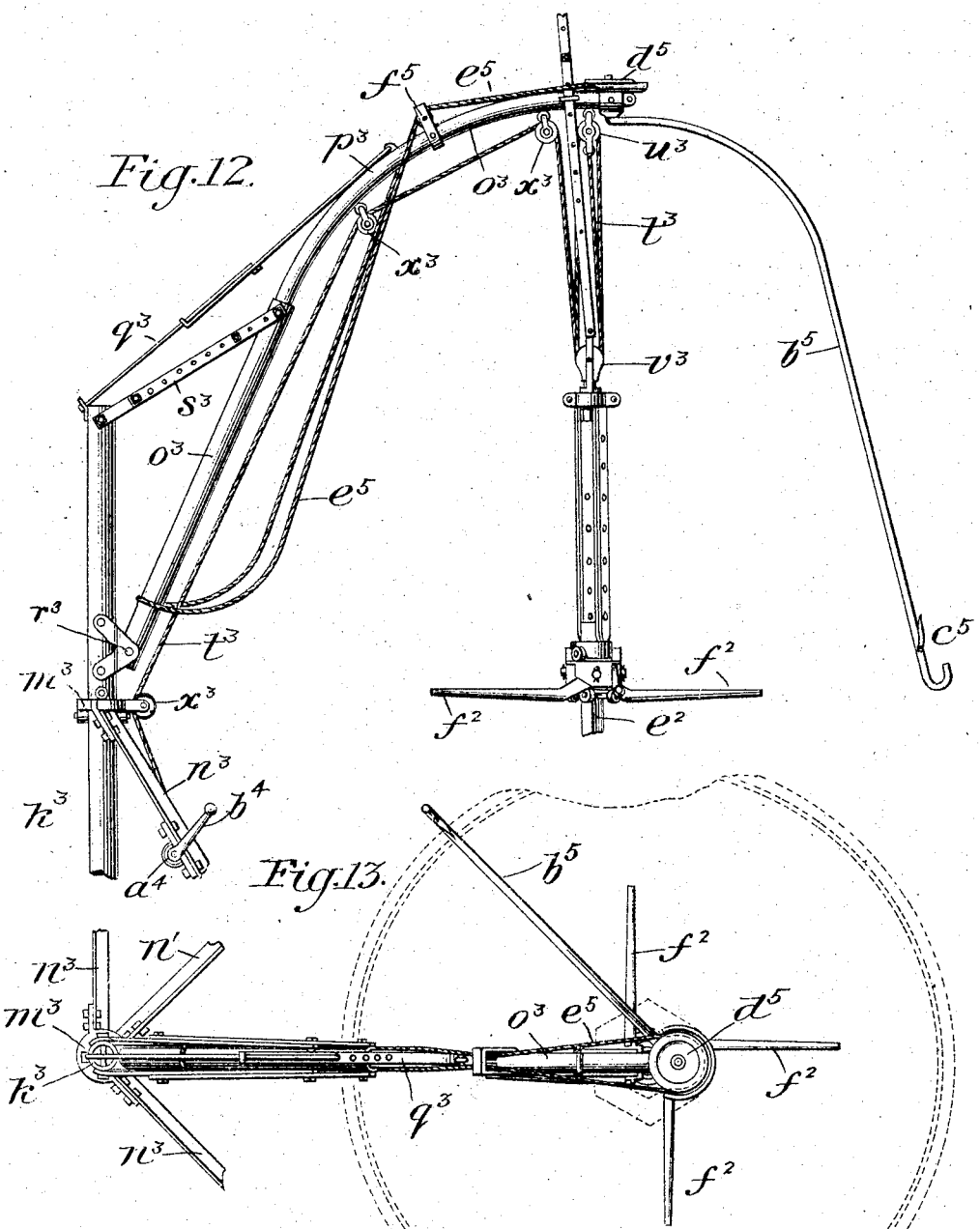

No. 772,452. Patented October 18, 1904.

UNITED STATES PATENT OFFICE.

BERT R. BENJAMIN AND JOHN W. PRIDMORE, OF CHICAGO, ILLINOIS, ASSIGNORS TO INTERNATIONAL HARVESTER COMPANY, OF CHICAGO, ILLINOIS, A CORPORATION OF NEW JERSEY.

CORN-HARVESTER.

SPECIFICATION forming part of Letters Patent No. 772,452, dated October 18, 1904.

Application filed March 28, 1903. Serial No. 149,993. (No model.)

*To all whom it may concern:*

Be it known that we, BERT R. BENJAMIN and JOHN W. PRIDMORE, citizens of the United States, residing at Chicago, county of Cook, State of Illinois, have invented certain new and useful Improvements in Corn-Harvesters; and we do hereby declare the following to be a full, clear, and exact description of the invention, such as will enable others skilled in the art to which it appertains to make and use the same.

The invention has to do generally with that type of machines where the standing stalks are cut and transferred to a platform or table which rotates slowly until a shock has accmulated thereon around a central post, when the machine is stopped, the shock is compressed and tied around the top, and the post and shock together are lifted from the platform by a crane and swung around to the rear and deposited on the ground standing on end behind and to one side of the traction-wheel of the machine.

Specifically, the invention relates to the construction of the framing of the machine with the object of making it as light, strong, and rigid as possible; also, to the manner of communicating power from the traction-wheel to the various moving parts, the purpose being to simplify the gearing and to dispense with individual driving mechanisms and have all the parts operated directly from a single counter-shaft; also, to provide a temporary supplemental support located in such position that as the crane swings the shock rearward and changes the balance of the machine it will prevent the machine from being tipped backward by the weight of the shock; also, to the means for operating the two sets of yielding compressor-fingers with which this class of machines is generally provided, the object here being to effect a quick release of the shock by simultaneously and positively opening the fingers at the proper time and quickly returning them to position to receive a new shock.

The invention further comprises an improved means for carrying the compressing-cord and the binding-twine around the shock preparatory to tying the band and depositing the shock upon the ground and a simple and powerful arrangement whereby sufficient leverage on the post of the crane is secured to revolve it easily and promptly when the entire weight of the shock is suspended from the overhanging arm.

Minor improvements in details of construction of other parts of the machine will be explained as the description proceeds.

The invention is illustrated in the accompanying drawings, wherein—

Figure 1 is a stubble side elevation of the machine, in which a portion of the tongue and the crane are shown broken away and the location of the gathering devices, traction-wheel, and the platform are indicated by dotted lines. Fig. 2 is a plan view of the parts shown in Fig. 1, in which the gathering devices are omitted and the location of the traction and supporting wheels and the platform are indicated by dotted lines. Fig. 3 is a fragmentary elevation of the opposite side of the machine from that shown in Fig. 1, in which the location of the platform and the supporting-wheel are indicated by dotted lines. Fig. 4 is a fragmentary view of the platform, the shield around the outer edge thereof, and the chute connected with said shield through which the stalks are conducted from the cutting apparatus to the platform. In this view the location of the lower gathering-chains is shown in dotted lines. Fig. 5 is a perspective view of the main frame, showing its structure. Fig. 6 is a plan view of a portion of the main frame, showing the location of the vertical posts which carry the yielding compressor-fingers and the connection between said posts whereby the compressor-fingers may be opened or separated and closed simultaneously. Fig. 7 is a fragmentary side elevation corresponding to Fig. 1, showing the supplemental support and the means for revolving the crane. Fig. 8 is a rear elevation of the parts shown in Fig. 7. Fig. 9 is a detail showing the means for securing the compressor-fingers to their respective posts. Figs. 10 and 11 are details of the construction of the chute through which the stalks pass to the platform. Fig. 12 is a side elevation of the upper portion of the crane, showing the cord-carrier and the means for revolving the same about the shock. Fig. 13 is a plan view of the part shown in Fig. 12, in which the cord-carrier is shown about in its initial position.

Referring first more particularly to Fig. 5, $a$ $a$ denote fore-and-aft frame-bars lying one on each side of the traction-wheel. The front and rear cross-sills are denoted by $b$ and $c$, respectively, and it will be noted that they are continuous clear across the frame in front and rear of the traction-wheel. The rear sill is preferably continued around the rear outer corner of the frame, as at $d$, so as to form the fore-and-aft bar $d'$ at the outer side of the machine, and the frame is also provided with intermediate cross-bars $e$, $f$, and $g$, extending from this outer side bar to the corresponding one extending along the inner side of the traction-wheel.

The gathering-prongs are denoted at $h$ and $i$, and preferably they are continuous from the rear sill to the points $i''$ and are secured at intermediate points to the cross-bars $e$, $f$, and $g$, bracing and being braced by said bars. Braces $j$ $k$ are provided for these prongs. As here shown, the inner one, $j$, extends rearward to the cross-bar $e$ and is fastened to this and the front sill. The outer one, $k$, is secured to the outer end of the front sill and joins the outer side bar between the sills $b$ and $c$. Obviously these braces may be connected to the cross-bars at any other points and in any suitable manner; but it is desirable to further brace the inner prong by a diagonal supplemental brace $l$, so as to give this prong as wide a base-support as the outer one. The brace $l$ is preferably continued to the rear and secured to the inner end of the cross-sill $f$.

The machine-frame as thus constructed is supported and balanced on the usual wheels, of which the outer one is adjustable in a casting. (Best shown in dotted lines in Fig. 5.) The inner wheel is adjustable in quadrant-racks $m$ $m$, that are secured at their lower ends to the frame-bars $a$ $a$ and are supported at their upper ends by arched braces $n$ $n$, and the front and rear sills of the frame are stiffened and prevented from bending down under the heavy weight imposed on them by adjustable tie-rods $o$ $o$, secured at one end to the stubble-corners of the frame and at the other to the sills $b$ $c$ at points well out toward the opposite side of the machine.

The machine is to be provided with any suitable draft devices. As here shown, it has a tongue pivoted at $p$ to a casting secured to the extended front end of the inner frame-bar $a$, and the tongue is made adjustable by means of a hand-lever $q$, that is secured to one end of a short rock-shaft $r$, the other end of which is link-connected to a plate $s$, extending from the tongue rearward of its pivot. The tongue preferably has a diagonal brace $t$, extending to the inner prong and pivoted there in line with the pivot $p$, and the lever $q$ has the usual segment rack and latch for locking it in different positions to set the tongue higher or lower and correspondingly incline the frame.

The space between the prongs $h$ $i$ forms the usual passage-way for the stalks, and on the prongs are mounted the usual guiding and deflecting boards $t''$ and $t^3$ and the gathering and forwarding chains $u$ $v$. (Shown in dotted lines in the first and fourth figures.)

On the grain side of the platform outside of the passage-way and immediately in rear of the gathering-chains a standard $w$ rises vertically from a seat $x$ on the outer side bar $d'$ and has its upper end bent horizontally to form a support for the rear end of the guide-board $t''$, which is secured to it by clips $y$ $y$. (Shown in Fig. 5.) The standard $w$ is braced by diagonal tie-rods, such as $z$ $z$ $z$, and in addition to supporting the guide-board its horizontal part $a'$ forms a convenient means for upholding and steadying an oscillating post $b'$, which is journaled in a bearing-bracket $c'$ at its lower end and has secured to it at appropriate intervals alongside its length the elastic fingers $e'$ for compressing the shock on the outer side. There may be any desired number of these fingers. Two are shown herein secured directly to the post, and a third, $f'$, is fastened to a projection $g'$, extending above the post, the latter being intended more especially for the tops of tall corn. The form of these fingers is not of particular consequence, and they may be secured to the post in any way. They are here shown as formed of stout wire rods bent to the proper curvature and fastened by clamps $h'$, that are bolted to the post, so as to clamp the bent ends of the fingers thereto.

At the rear of the frame, on the opposite side of the passage-way and near the rear corner of the traction-wheel, there is located another oscillating post, $i'$. Like the post $b'$ it is journaled in a bearing-bracket $j'$ and has elastic fingers $k'$ secured to it for compressing the shock on the stubble side opposite to the outer fingers $e'$. The fingers are secured to this post by clamps $l'$ in all respects like those securing the outer fingers to the post $b'$, and they are curved in the reverse direction, so that the two sets of fingers oppose each other and inclose and compress the shock between them.

The post $i'$ is upheld and steadied by an arm $m'$, which extends diagonally forward and connects with a brace $n'$, extending from the front cross-bar $b$ near where the prong-brace $l$ crosses it upward to a sleeve $m^3$, that loosely encircles a crane-standard to be described later on.

The shock-compressing fingers $e'$ and $k'$ project toward each other, and being bent, as before described, receive the stalks from the rear end of the passage-way and compress them, so that the shock is compactly formed on the platform presently to be described. In order to open the fingers promptly, so as to release the shock and permit it to be lifted off the table, the posts $b'$ and $i'$ are provided at their lower ends with crank-arms $p'$ and $q'$, respectively, and an adjustable connecting-rod $r'$ connects the arms together and rocks the posts simultaneously in opposite directions, so as to move both sets of compressor-fingers away from around the shock at the same time, thereby quickly releasing the shock and as quickly returning the fingers to normal position after the shock has been removed.

In order to operate the posts in the manner just described, a lever $s'$ is attached to the post $i'$. The lever is provided with a detent, and a notched or perforated locking-quadrant $t'$ is secured to the braces $m'$ (already described) and $u'$, so that the crank may be locked to the quadrant in position to hold the compressor-fingers open or secure them in closed position around the shock. The operation of oscillating the posts $b'$ and $i'$, so as to open and close the fingers in this way, is clearly indicated in Fig. 6, where they are shown closed in full lines and open in dotted lines.

As in the case of the post $b'$ there may be any number of compressor-fingers on the post $i'$. They may be shaped and constructed in any suitable way; but the uppermost one (the one that acts on the tops only of the corn) is preferably formed with a forwardly-extending end $v'$, which serves as a deflector to prevent the stalks from falling before they are engaged by the opposite set of fingers, which might otherwise happen in view of the fact that their butts are suddenly advanced at the moment they reach the platform on which the shock is formed. This platform is denoted by $a^2$, Figs. 4 and 11, where it is shown in part in full lines, and its position is indicated in other figures in dotted lines. The construction of the platform proper and its immediate operating mechanism form no part of the present invention, and it is therefore not deemed necessary to describe it further than to say that it is preferably round, as usual, and is provided on its upper surface with curved ribs or flanges $b^2$, extending outward from the central part $c^2$ of the platform in a sort of spiral direction, extending first rearward as regards the direction of the platform's rotation, as shown at 34, Fig. 4, and then forward in the direction of movement of the platform. The object of these flanges is to catch the butts of the stalks as the corn comes out of the rear end of the passage-way and cause them to move around promptly with the top part of the stalks. The peculiar curvature of the flanges causes them to work the stalks in toward the center of the platform, so that a more compact shock results, and to still further assist in thus centralizing the accumulating stalks a supplemental yielding finger $d^2$ is secured just above the level of the platform to the standard $w$ at the outer side of the platform. This finger projects inward over the platform, as shown in Figs. 2 and 3, and is slightly curved in the opposite direction to the ribs on the platform. As the platform revolves in the direction of the arrows, Figs. 2 and 4, this finger presses the butts of the stalks inward and coöperates with the forwardly and outwardly curved fingers to gradually work the butts in close to the center. The platform has the usual central post, around which the shock is formed. It is denoted at $e^2$, Figs. 2, 4, and 12, and is removable or detachable from the platform in the usual way. The post has radial arms $f^2$ projecting from it near the upper end and may be connected to the platform so as to be rotated thereby or may be rotated by other means independently of the platform.

The platform and post are preferably supported and operated in the manner illustrated and described in Patent No. 714,999, issued to Benjamin and Pridmore December 2, 1902, though the present invention is not to be understood as limited thereto or to any particular means for this purpose. As here shown, the post $e^2$ is stepped in a bearing carried by a casting $g^2$, that is secured to and supported by the cross-bars $f$ and $g$ of the machine-frame. It may, however, be supported by the platform, if preferred. The platform is located at the rear of the frame, with its center a little to the traction-wheel side of the line of the passage-way. It is supported around its edge by antifriction-rollers $h^2$. The rearmost one of these rollers is carried by a bracket $i^2$, that projects from the frame-bar $c$ and supports the overhanging rear edge of the platform. Another of the rollers is journaled upon a short shaft $k^2$, just outside of the pinion $l^2$, which rotates the platform. Other rollers may be located at convenient points, and the central part of the platform may be supported by similar rollers located at suitable points. In Fig. 2 one of such rollers, $j^2$, is shown journaled on the shaft $m^2$, by means of which the central post $e^2$ is driven independently of the platform; but as to the whole manner of supporting and driving the post and platform we desire it to be understood that the present illustration and description is only intended to give a general understanding of the arrangement, reference being made to the patent above referred to for the details of the preferred though not the essential arrangement.

In the present invention there is provided in connection with the platform a circular shield $n^2$, extending all around the platform just inside of its outer edge. The object of this shield is to prevent the butts of the stalks from sliding off the platform and to hold the lower part of the shock intact until it is ready to be removed. The shield stands vertically, as shown in full lines in Fig. 11 and in dotted lines in all the other figures, and extends above the level of the platform to about the point indicated. It is entirely independent of the platform and is supported at its rear side by the overhanging bracket $i^2$, to which it is secured at $o^2$. Other points of support and attachment are located on the frame-bars around the shield's circumference. At its front side in line with the stalk passage-way there is an opening $r^2$ in the shield, so as to permit the stalks to pass onto the table, and the rear end of the passage-way is provided with an inclined chute or flooring $q^2$, extending from the cutting apparatus up to the level of the platform, and the chute is preferably provided with vertical side walls $s^2$, having laterally-projecting horizontal flanges $t^2$, which are extended downward and forward and secured to the prongs $h$ $i$, as shown in Fig. 4, and the front part of the shield is secured to and supported by the chute-walls, as indicated in Figs. 4 and 11. The stalks are carried on end up the chute by the forwarding-chains and pass through the opening $r^2$ onto the shock-forming platform and within the inclosure formed by the shield. As they pass onto the platform they are carried around by the arms on the revolving post $e^2$, the curved ribs or flanges on the surface of the platform, assisted by the yielding finger $d^2$, which projects through the slot $p^2$ (see Fig. 3) in the shield, serving to carry the butts around and work them gradually in toward the center.

The cutting apparatus, (which may be of any preferred type,) the gathering devices already described, and the shock-forming platform are all arranged to be driven from a single counter-shaft $a^3$. As shown in dotted lines in Fig. 2, this shaft extends along the front edge of the frame and is journaled in bearings $b^3$. It is driven by a chain from the traction-wheel, and a clutch $c^3$ is provided to permit its disengagement from the driving mechanism. At appropriate points the shaft $a^3$ is provided with pinions $d^3$, $e^3$, $f^3$, and $g^3$ for driving, respectively, the cutting apparatus, the platform, the shock-forming post, and the gathering and forwarding chains. The pinion $d^3$ meshes with a similar pinion on the crank-shaft $h^3$, to which the knife $i^3$ is connected by the usual pitman. The pinion $e^3$, which is conveniently made in one piece with the pinion $d^3$, meshes with a pinion on the shaft $k^2$, which drives the platform, as before described, and the shaft $m^2$, which drives the platform-post, is gear-connected to the pinion $f^3$. The pinions $g^3$ are gear-connected to the forwardly-inclined shafts $i^3$, (shown in dotted lines in Figs. 1 and 4,) that drive the gathering and forwarding chains. The driving mechanism being as thus described, it will be noted that all the operative parts are driven by a single shaft and that power is distributed from this shaft to the several parts as desired. This arrangement is advantageous in that the gearing is simplified, a more direct drive for the several parts is provided, and the location of the shaft brings all the gears to a convenient and accessible point. Of course it will be understood that the two shafts $k^2$ $m^2$ are required only when the post $e^2$ and the platform are independently driven. Should the post be arranged to be driven by the platform, the shaft $m^2$ and its pinions would be dispensed with and the gearing further simplified.

It has already been explained that the shocks in this type of machines are lifted from the platform and swung around to the rear by a crane. The vertical post $k^3$ of the crane in this machine is stepped on a bearing $l^3$, secured to the stubble side bar $a$ outside of the traction-wheel in rear of the axle. The post is braced by a collar $m^3$ near its upper end, in which and on its step $l^3$ it turns freely. The collar is secured to the upper ends of inclined braces $n^3$ $n^3$, that are secured at their lower ends, respectively, to the rear cross-sill $c$ and the front stubble corner of the frame, and it is also secured to the upper end of the brace $n'$, before described, so that the crane as a whole is firmly upheld and braced by a tripod-like frame, at the apex of which the collar $m^3$ is located.

The crane-post is extended some distance above the collar and has an arm $o^3$ pivoted to it at $r^3$. The arm is curved, as at $p^3$, and overhangs the central part of the platform and is braced from the post by adjustable straps $q^3$ $s^3$, so as to permit it to be set higher or lower, as required. It is provided with a hoisting-rope $t^3$, which is secured at one end to a block $u^3$ and passes through a double sheave $v^3$ on the upper end of the platform-post, this rope constituting the means by which the post and the shock are lifted from the platform. The rope passes from the sheave $v^3$ up to other sheaves, $x^3$, on the arm $o^3$ and thence goes to a roller or winch $a^4$, which is journaled in bearings on the inclined braces $n'$ $n^3$ and has a hand-crank $b^4$, by means of which the rope may be wound and the shock and post lifted vertically till both are free of the platform and above the edge of the shield $n^2$. When in this position, the crane and its post have to be turned so as to swing the shock rearward, and as the shock is very heavy considerable force is required to revolve the crane. We therefore pivot a long lever $c^4$ to it, and a novel feature of the invention consists in utilizing this lever as a support for the driver's seat $d^4$. This we are enabled to do by pivoting the lever at the right height and extending it sufficiently far to the rear to secure a powerful leverage on the crane-post, in the first place, and, in the next place, to locate the seat in the right position for the driver. This combined lever and seat-support is provided with legs $e^4$ $e^4$, which are secured to its under side near its opposite ends and extend downwardly toward each other to a point about under the center of the lever. At this point they are connected together and secured to a saddle $f^4$, which is adapted to fit loosely over a bracket $g^4$, projecting laterally from the side bar $a$. The lever is thus supported so as to bring the seat at the right elevation and so, also, that the saddle may easily be lifted from the bracket and the lever be used to revolve the crane.

The bracket $g^4$ and a similar bracket $g^6$, projecting parallel with it from the frame-bar $a$ nearer the crane-post, support a footboard $g^5$, which extends along the stubble side of the rear part of the machine in convenient position for the driver's left foot while occupying the seat. On the opposite side of the seat there is another footboard, $h^4$, the latter board being supported by rearwardly-extending brackets $i^4$, secured to the rear cross-bar $c$.

As will be best understood from the plan views, the platform is so located and the frame so proportioned as to balance the machine on the supporting-wheels when a shock is on the platform, and considering the before-described method of depositing the shock it will be understood that this balance will be destroyed when the weight of the shock is swung around to the rear. This tends to tip the machine over backwardly and throws up the tongue, and in order to prevent the rear part of the machine from actually falling we provide a temporary or emergency support which is preferably in the form of a shoe or runner $j^4$, which is located just under the rear stubbleward corner of the machine, behind the traction-wheel, as best shown in Fig. 2. This shoe is secured about midway of its length to the lower end of a curved standard $k^4$, which extends upward and slides through a keeper $l^4$, secured to the rear cross-bar $c$, and adapted to be adjusted to different elevations by a dog $m^4$, projecting downward from a short shaft journaled in the keeper $l^4$ and adapted to lock into any one of a series of openings $n^4$ along the standard. The shaft of the dog has an arm $o^4$, provided with a footpiece $p^4$, by means of which it may be operated from the driver's seat to release or lock the standard, a spring $q^4$ being combined with the arm to make the dog self-locking.

The shoe, in addition to being secured to the standard $k^4$, is preferably also pivoted at its front end to a radius rod or link $a^5$, that is pivoted at a point near the front corner of the frame, the object of this link being not only to guide the shoe in its vertical movements, but also to take the strain off the standard when the shoe slides on the ground, as it sometimes does. In the normal operation of the machine this supplemental support is usually carried in the position indicated in dotted lines in Fig. 7, and whenever a shock is tied and is ready to be deposited the driver releases the standard and allows it to fall and be locked in the position shown in full lines, so that it operates as a prop or additional support for the machine. If the ground is smooth and even, the shoe may be adjusted in an intermediate position, where it may be locked without requiring it to be set whenever a shock is to be deposited. In this position the shoe would allow the machine to tilt slightly, but not sufficiently to throw the tongue far enough up to trouble the team.

There is no particular novelty in the construction or arrangement of the overhanging arm of the crane and the shock-hoisting tackle already described; but at the upper end of the arm, immediately over the post around which the shock forms on the platform, we pivot a down-hanging outwardly-curved arm $b^5$, which is provided at its lower end with a hook and latch $c^5$ for the purpose of holding and carrying the cord for compressing the shock and the twine with which it is to be bound. At its upper end the arm has a grooved roller or sheave $d^5$ secured to its pivot, and around this roller an endless rope $e^5$ passes and extends down along the arm $o^3$ to a point within the reach of the operator, the rope preferably passing over guide-pulleys $f^5$ on its way. The normal position of this cord-carrying arm is shown in Fig. 13, where it is seen pointing forward and stubbleward. When the shock is formed and ready to be deposited on the ground, the arm carrying the cord and twine is made to revolve around it by operating the rope $e^5$. The shock is then compressed and bound, after which the arm is returned to normal position, the binding-twine being again attached to the hook.

It is believed that the operation of the machine and all its working parts have been sufficiently set forth in the above description to avoid the necessity for further explanation. Therefore,

What we claim, and desire to secure, is—

1. A corn-harvester frame, comprising front and rear cross-sills extending beyond the traction-wheel, a fore-and-aft bar on each side of the wheel, and adjustable tie-rods underlying the cross-sills and secured to the stubble corners of the frame at one end and to the sills at points about midway between the wheels.

2. A corn-harvester frame, comprising a fore-and-aft bar on the inner side of the traction-wheel, a tongue secured to a forward extension of the bar, an inner gathering-prong, a brace $j$ for the prong, a tongue-brace $t$ extending rearward and grainward to the prong-brace, and a brace $l$ extending from the prong-brace rearward and stubbleward and secured near the rear end of the fore-and-aft bar.

3. A corn-harvester having a cutter, gathering devices, a rotating shock-forming platform, and a central post on the platform combined with a traction-wheel, and a counter-shaft extending across the front of the machine and driven from the traction-wheel, said shaft having cutter and gatherer driving pinions $d^3$, $e^3$ and $g^3$, and a post-rotating pinion $f^3$.

4. A corn-harvester having a shock-forming platform, a rotary crane for lifting the shock from the platform and depositing it in rear of the traction-wheel, and a supplemental support to prevent the weight of the shock as it swings rearward from tilting the machine, a curved standard to the foot of which the support is secured, means for releasably locking the standard at different elevations, and a connection from the support to the front part of the machine.

5. A corn-harvester having a shock-forming platform, a rotary crane for lifting the shock from the platform and depositing it in rear of the traction-wheel, a supplemental support to prevent the weight of the shock as it swings rearward from tilting the machine, said support consisting of a shoe, a curved standard to the foot of which the shoe is connected, a link pivotally connected to the machine in front of the shoe and secured at its rear end to the shoe, a keeper in which the standard slides, and a foot-operatable device for releasably locking the standard at different elevations.

6. A corn-harvester having a shock-forming platform, a rotary crane for lifting the shock from the platform and depositing it in rear of the traction-wheel, and a supplemental support to prevent the weight of the shock as it swings rearward from tilting the machine, said support consisting of a shoe, a curved standard to the foot of which the shoe is connected, a keeper in which the standard slides, a spring-actuated latch $m^4$, a series of perforations in the standard to receive the latch, a foot-piece $p^4$ to operate the latch, and a link $a^5$ pivotally connected at one end to the front part of the machine and at the other end pivoted to the shoe.

7. A corn-harvester having a passage-way for the corn, a shock-forming platform in rear thereof, rotary posts located at the periphery of the platform, oppositely-curved shock-supporting fingers carried by the posts, and means connecting the posts together and causing them to rotate simultaneously so as to open the fingers and release the shock.

8. A corn-harvester having a passage-way for the corn, a shock-forming platform in rear thereof, rotary posts on opposite sides of the platform, oppositely-curved shock-supporting fingers carried by the posts, crank-arms on the lower ends of the posts, a rod connecting the arms and causing the posts to rotate together to open and close both sets of fingers simultaneously, and means for rotating one of the posts.

9. A corn-harvester having a passage-way for the corn, a shock-forming platform in rear thereof, rotary posts on opposite sides of the platform, oppositely-curved shock-supporting fingers carried by the posts, crank-arms on the lower ends of the posts, a rod connecting the arms and causing the posts to rotate together to open and close both sets of fingers simultaneously, a hand-crank secured to one of the posts, and a quadrant to which the crank may be locked so as to secure the fingers in open or closed position.

10. A corn-harvester having a passage-way for the corn, a shock-forming platform in rear thereof, a post rising from the center of the platform around which the shock is formed, a rotary post on the outer side of the platform having curved shock-supporting fingers, and means connected to the side post and extending to the other side of the platform and passage-way in position to be operated by the driver.

11. A corn-harvester having a passage-way for the corn, a shock-forming platform in rear thereof, a rotary post located on the outer side of the passage-way in rear of the gathering devices and having rearwardly and inwardly curved fingers, and a rotary post located near the rear, inner corner of the traction-wheel, and having forwardly and outwardly curved shock-supporting fingers, the uppermost finger on said post having its outer end bent back and extended forward so as to prevent the corn from falling.

12. A corn-harvester having a passage-way for the corn, and a rotary shock-forming platform, the surface of the table being provided with ribs or flanges $b^2$ extending from the center in a generally outward direction and curved backwardly as at 34 and then forwardly in respect of the direction of the platform's rotation.

13. A corn-harvester having a passage-way for the corn, a rotary shock-forming platform, a stationary upstanding guard or shield around the edge to confine the butts of the corn, an inclined chute or floor leading from the level of the cutter to the platform, and an opening in the shield in line with the passage-way through which the corn may pass onto the platform, the chute having side walls secured to the shield at their rear ends.

14. A corn-harvester having a passage-way for the corn, guiding-prongs on each side of said way, a rotary shock-forming platform, an upstanding guard or shield around the edge of the platform, an opening in the shield through which the corn may pass onto the platform, an inclined chute or floor leading from the level of the cutter to the platform, side walls to the chute secured to the shield at their rear ends, and flanges extending horizontally from the upper edges of said walls and continued down and secured to the prongs in front of the cutter.

15. A corn-harvester having a shock-forming platform, a crane for lifting the shock and depositing it on the ground, and a lever for rotating the crane, said lever having the driver's seat secured to it.

16. A corn-harvester having a shock-forming platform, a crane for lifting the shock and depositing it on the ground, and a lever for rotating the crane, said lever extending normally rearward and serving as a seat-support.

17. A corn-harvester having a shock-forming platform, a crane for lifting the shock and depositing it on the ground, a lever for rotating the crane, said lever being pivoted to the post, and provided with legs whereby it is supported by the machine-frame in a normally rearwardly-extended position, and a seat for the driver carried by the lever.

18. A corn-harvester having a shock-forming platform, a crane for lifting the shock and depositing it on the ground, said crane including a post and a seat-support secured to the post and extending horizontally so to serve as a lever to rotate the crane.

19. A corn-harvester having a shock-forming platform, a crane for lifting the shock and depositing it on the ground, a lever $c^4$ pivoted to the post, a bracket $g^4$ on the frame, legs $e^4$ depending from the lever and adapted to rest on the bracket, and a seat $d^4$ on the rear end of the lever.

20. A corn-harvester having a shock-forming platform, a crane for lifting the shock and depositing it on the ground, a lever $c^4$ pivoted to the post and having legs $e^4$ to support it, a bracket $g^4$ on the frame, a saddle $f^4$ secured to the supporting-legs and straddling the bracket, and the driver's seat secured to the lever.

21. A corn-harvester having a shock-forming platform, an arm overhanging the center of the platform, an outwardly and downwardly extending cord-carrier journaled at its upper end to the arm, and means for rotating the carrier to pass the cord around the shock.

22. A corn-harvester having a shock-forming platform, an arm overhanging the center of the platform, an outwardly and downwardly extending cord-carrier journaled at its upper end to the arm, a pulley on the journal end of the carrier, and an operating-cord extending around the pulley and carried down into convenient position for the driver to reach.

23. A corn-harvester having a shock-forming platform, a central post thereon, a crane for lifting the shock from the platform, and depositing it on the ground, an outwardly and downwardly extending cord-carrier journaled in the overhanging arm of the crane, and means extended into position to be reached by the driver whereby he may rotate the carrier and pass the cord around the shock.

24. A corn-harvester having a shock-forming platform, a central post thereon, an overhanging crane-arm for lifting the shock from the platform, and depositing it on the ground, an outwardly and downwardly extending cord-carrier $b^5$ having a grooved operating wheel or pulley $d^5$ at its upper end and journaled in the overhanging crane-arm, and an endless operating-rope $e^5$ by means of which the driver may rotate the carrier and pass the cord around the shock.

In testimony whereof we affix our signatures in presence of two witnesses.

BERT R. BENJAMIN.
JOHN W. PRIDMORE.

Witnesses:
J. J. BUTLER,
CHAS. N. CHAMBERS.